(12) United States Patent
Abbasi et al.

(10) Patent No.: US 11,026,176 B2
(45) Date of Patent: Jun. 1, 2021

(54) PERFORMANCE ENHANCEMENTS THROUGH WAKEUP OPTIMIZATIONS

(71) Applicant: QUALCOMM Incorporated, San Diego, CA (US)

(72) Inventors: Hamza Ijaz Abbasi, San Diego, CA (US); Ralph Akram Gholmieh, San Diego, CA (US); Elmira Mazloomian, San Diego, CA (US); Liangchi Hsu, San Diego, CA (US); Alan Soloway, Erie, CO (US); Osama Lotfallah, San Diego, CA (US); Carlos Marcelo Dias Pazos, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 16/216,284

(22) Filed: Dec. 11, 2018

(65) Prior Publication Data

US 2020/0187121 A1 Jun. 11, 2020

(51) Int. Cl.
| | |
|---|---|
| *H04W 52/02* | (2009.01) |
| *G06F 1/3228* | (2019.01) |
| *G06F 1/329* | (2019.01) |
| *G06F 1/3209* | (2019.01) |
| *G06F 1/3203* | (2019.01) |
| *G06F 9/4401* | (2018.01) |

(52) U.S. Cl.
CPC ........ *H04W 52/0258* (2013.01); *G06F 1/329* (2013.01); *G06F 1/3228* (2013.01); *G06F 1/3203* (2013.01); *G06F 1/3209* (2013.01); *G06F 9/4418* (2013.01)

(58) Field of Classification Search
CPC ...... G06F 1/3203; G06F 1/329; G06F 1/3209; G06F 9/4418; G06F 1/3228; H04W 52/0258
USPC .................................................. 713/320, 323
See application file for complete search history.

(56) References Cited

U.S. PATENT DOCUMENTS

| | | | |
|---|---|---|---|
| 2009/0196212 A1* | 8/2009 | Wentink ............ | H04W 28/0289 370/311 |
| 2011/0239011 A1* | 9/2011 | Waris ................ | H04M 1/72569 713/310 |
| 2013/0080816 A1* | 3/2013 | Johnson .................... | G06F 9/52 713/401 |
| 2017/0257458 A1 | 9/2017 | Kim et al. | |

(Continued)

OTHER PUBLICATIONS

International Search Report and Written Opinion—PCT/US2019/065547—ISA/EPO—dated Mar. 17, 2020.

*Primary Examiner* — Ji H Bae
(74) *Attorney, Agent, or Firm* — Arent Fox, LLP

(57) ABSTRACT

Device wakeups can consume a significant amount of power with respect to the device's total power battery lifetime. Aspects of a method, apparatus, and computer-readable medium are presented herein that provide a solution to the problem of battery strain by improving the manner in which a wireless device coordinates device wakeup for multiple applications or multiple operations. An apparatus receives a wakeup time interval from each of a plurality of applications. The apparatus forms a first device wakeup time interval, the first device wakeup time interval including overlapping wakeup time intervals for the plurality of applications. The apparatus schedules a device wakeup during at least the first device wakeup time interval.

23 Claims, 11 Drawing Sheets

(56) References Cited

U.S. PATENT DOCUMENTS

2017/0364136 A1* 12/2017 Nandha Premnath .... G06F 9/46
2018/0173578 A1* 6/2018 Yang ....................... G06F 1/329

* cited by examiner

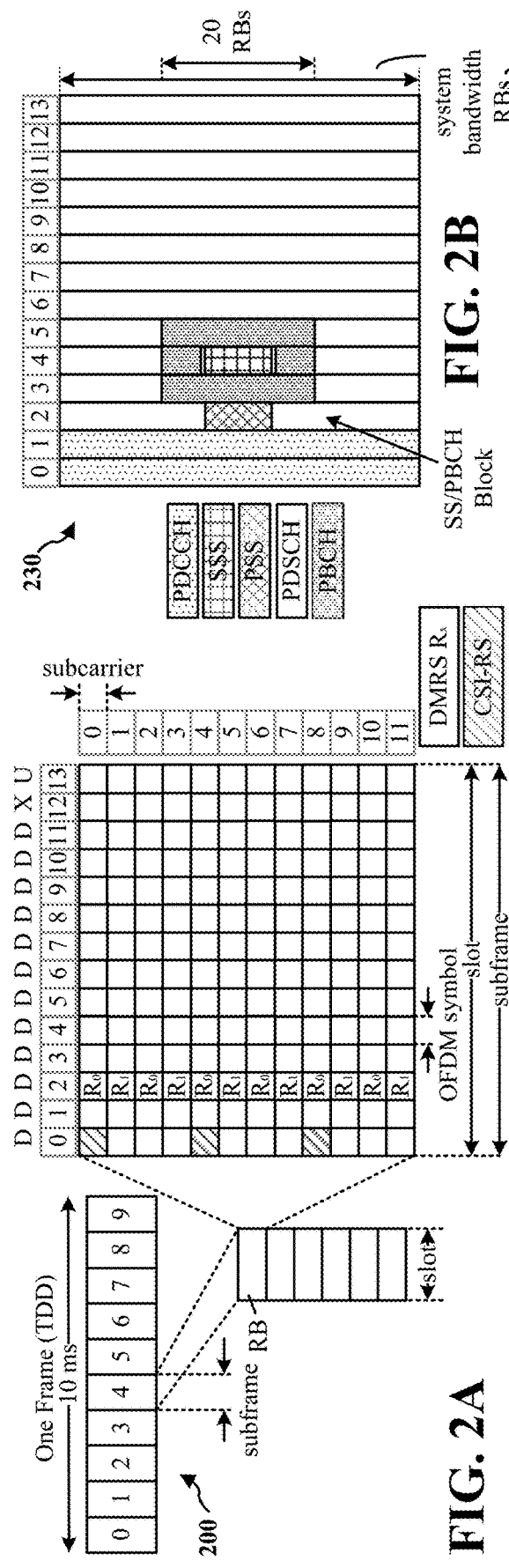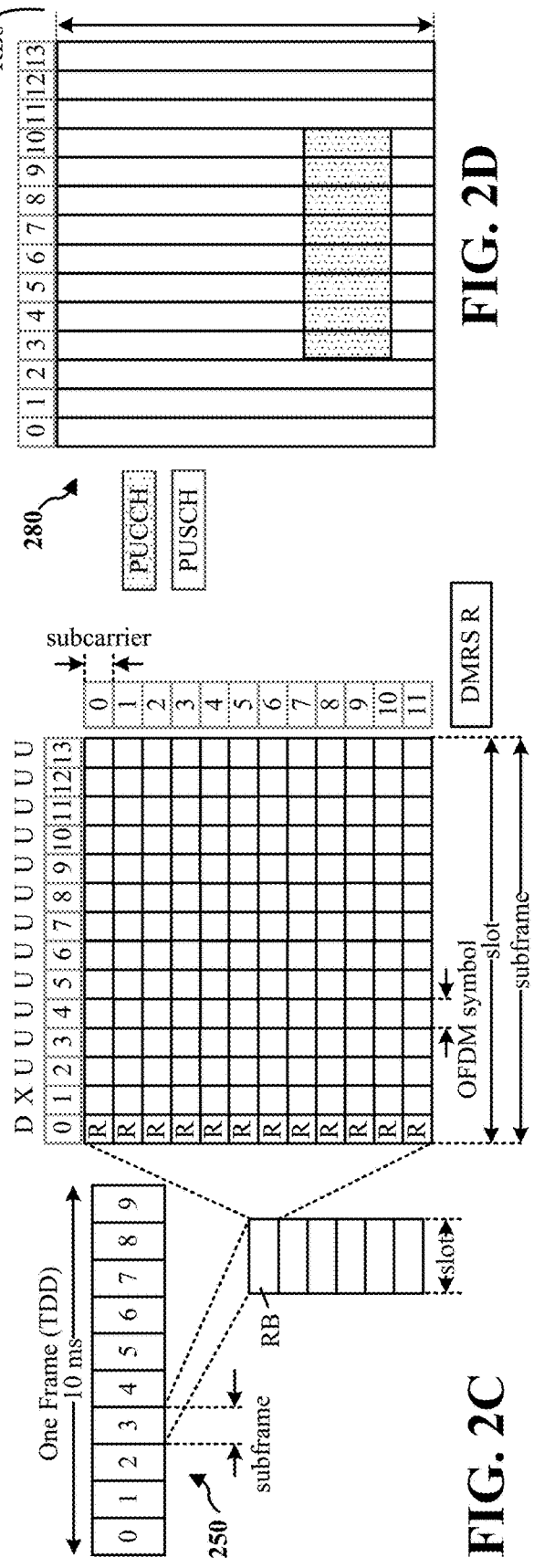

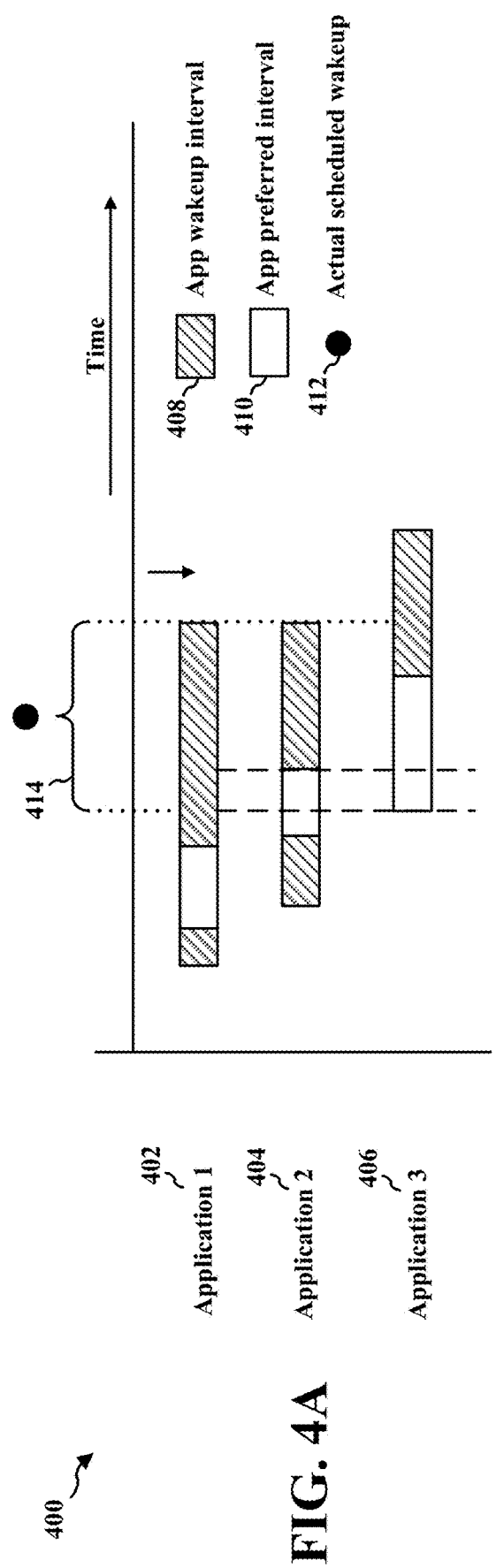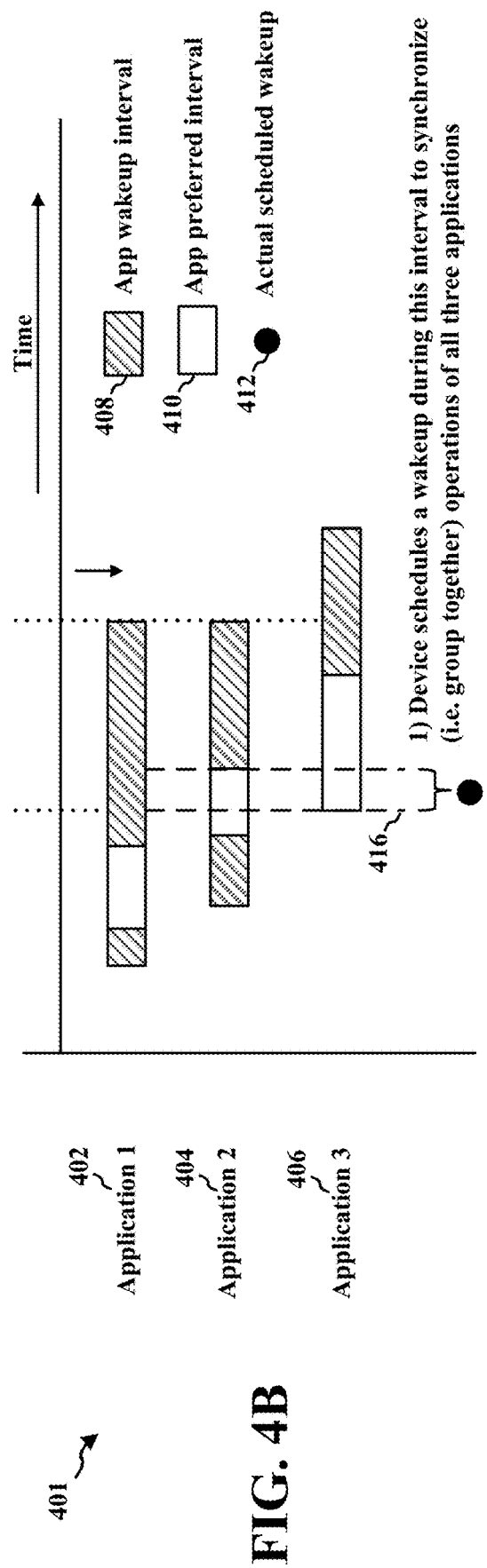
FIG. 4A
FIG. 4B

PERFORMANCE ENHANCEMENTS THROUGH WAKEUP OPTIMIZATIONS

BACKGROUND

Technical Field

The present disclosure relates generally to communication systems, and more particularly, to a wireless communication including device wakeup.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Multiple applications may place a strain on battery power for wireless devices through individual wakeup events at each of the multiple applications that cause the UE to operate in an active state over longer periods of time. Device wakeups can consume a significant amount of power with respect to the device's total power battery lifetime. Aspects presented herein provide a solution to the problem of battery strain by improving the manner in which a wireless device coordinates device wakeup for multiple applications or multiple operations. In some aspects, device wakeup procedures may be optimized to allow for multiple applications and/or operations to be grouped together and be performed in the same wakeup instance, which can lower power consumption to improve the battery lifetime of a wireless device. The grouping or synchronizing of multiple events in the same device wakeup, as presented herein, may reduce the number of required device wakeups and average duration of each wakeup.

In an aspect of the disclosure, a method, a computer-readable medium, and an apparatus are provided for wireless communication at a user equipment (UE). The apparatus receives a wakeup time interval from each of a plurality of applications. The apparatus forms a first device wakeup time interval. In some aspects, the first device wakeup time interval may comprise overlapping wakeup time intervals for the plurality of applications. The apparatus schedules a device wakeup during at least the first device wakeup time interval.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 4A and 4B illustrate example aspects of a device wakeup in accordance with certain aspects of the disclosure.

DETAILED DESCRIPTION

Figure 1:
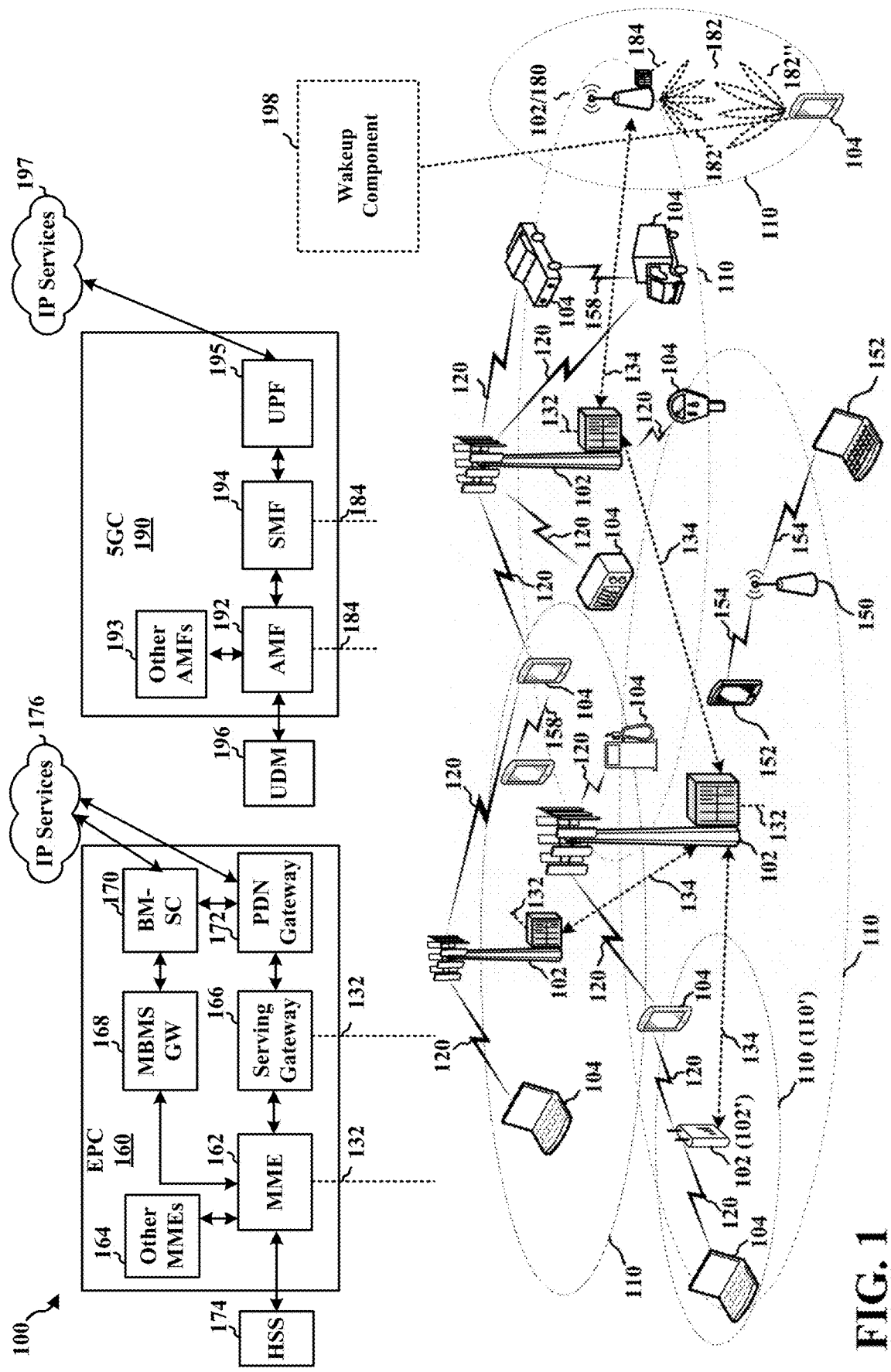
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a wakeup component 198 configured to form a first device wakeup time interval. The first device wakeup time interval may comprise overlapping wakeup time intervals for a plurality of applications. In some aspects, the wakeup component 198 may receive a wakeup time interval from each of a plurality of applications. The wakeup component 198 may then organize the wakeup time intervals for the plurality of applications to form the first device wakeup time interval, such that applications having wakeup time intervals that overlap are grouped together. The wakeup component 198 may schedule a device wakeup during at least the first device wakeup time interval.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ there are 14 symbols/slot and $2^\mu$ slots/subframe. The subcarrier spacing and symbol length/duration are a function of the numerology. The subcarrier spacing may be equal to $2^\mu *15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
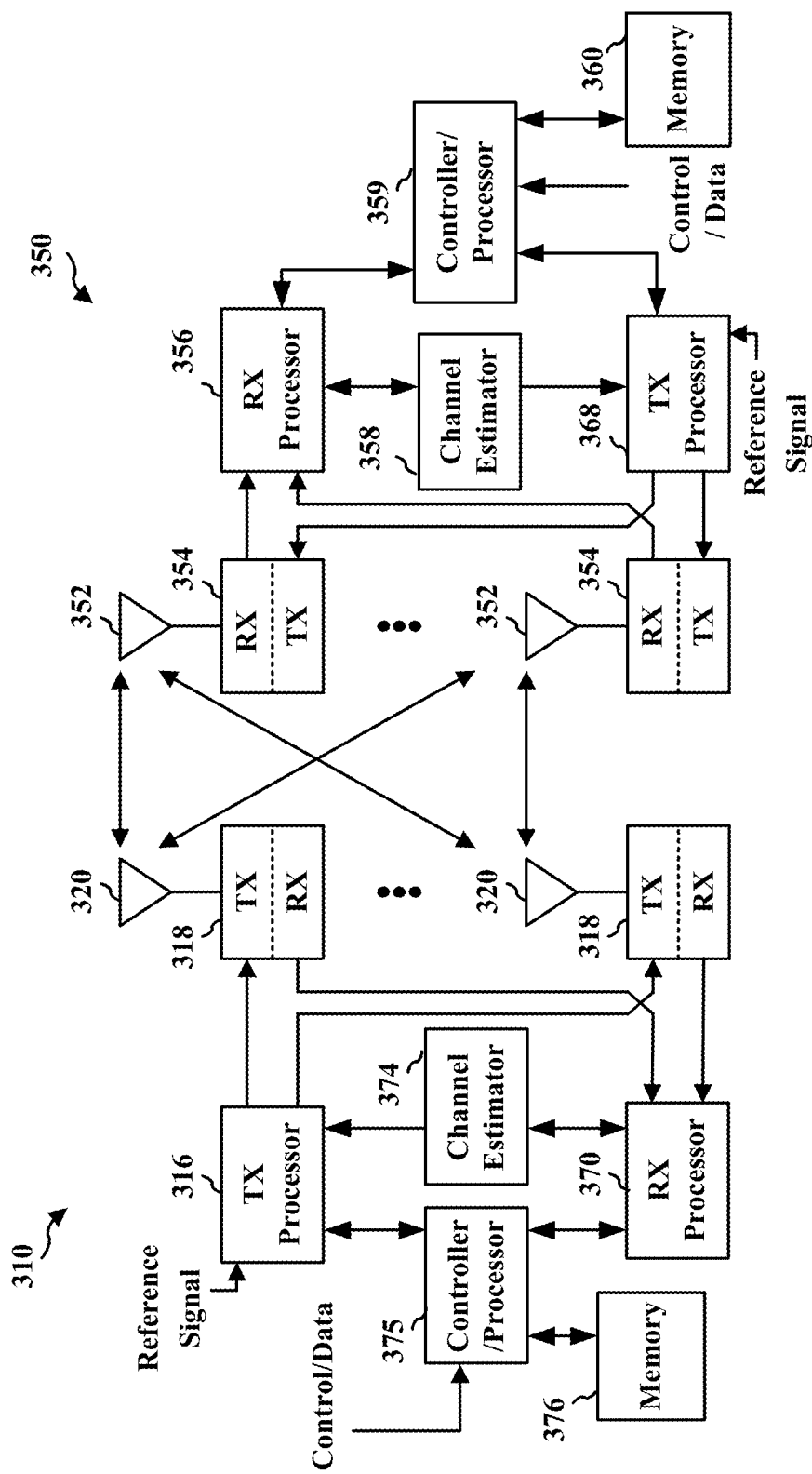
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Wakeup events occur individually for different applications in modems for wireless devices. This can place a strain on the battery power for the devices, especially for category M1 (CAT M1) and narrowband internet of things (NB-IoT)) devices. The unsynchronized wakeups may lead to additional device wakeups and longer amounts of time during which the device is active on average. Each application may individually provide its wakeup time settings to a power saving mode (PSM) coordinator. The PSM coordinator may be configured to schedule the device to wake up (e.g., exit PSM) based on the earliest application wakeup time settings.

A device may wake up a couple of times each day to collect data for various applications (e.g., temperature sensor, outdoor environmental sensor, etc.). The device may then send a report back to the server with the collected data. Device wakeups can consume a lot of power with respect to the device's total power battery lifetime.

Device wakeups in Lightweight machine to machine (LwM2M) client related events, operations, and/or features such as, for example, registration updates, information reporting, device management, and service enablement may also be scheduled individually for different events, operations, and/or features in an unsynchronized manner. As such, a device may experience additional device wakeups as well as long durations of each wakeup which may lead to significant and unnecessary power consumption, especially for NB-IoT and/or CAT-M1 devices. Such devices may have limited power and may have a limited battery capacity without a connection to any external power supply. In some instances, the battery lifetime of current devices may be reduced by several years due in part to the manner in which device wakeups are performed. Thus, there exists a need for power optimization for such devices to ensure efficient use of wireless resources and battery power, as well as longevity of the device. Optimizing the manner in which the devices wakeup can lead to a reduction in the number of wakeup events, which can extend the life of the battery. For example, if a device experiencing 4 device wakeups in a day is able to reduce the device wakeups to 3 in a day, the reduction could lead to an extended lifetime of the battery and longevity of the device.

In some aspects, device wakeup procedures may be optimized to allow for multiple applications and/or operations (e.g., IoT applications, LwM2M operations) to be grouped together and be performed in the same wakeup instance, which can lower power consumption to improve the battery lifetime, e.g., in resource constrained devices (e.g., NB-IoT and CAT M1 devices). The grouping or synchronizing of multiple events in the same device wakeup, as presented herein, may reduce the number of required device wakeups and average duration of each wakeup. In some aspects, the synchronization may occur across multiple applications. These applications may run independently and may not be aware of the operation of other applications of the device. Each application may be configured to provide a wakeup time interval to a component configured to coordinate the wakeups for individual applications in a combined manner. For example, each application may provide a wakeup time interval to the PSM coordinator, which may be configured to schedule a single wakeup interval for multiple applications having overlapping wakeup intervals. In some aspects, at least one of the applications may be configured to provide a preferred wakeup time interval and/or associated priorities for further optimization of the wakeup time scheduling. In some aspects, e.g., PSM-aware LwM2M devices, the client may be configured to synchronize multiple events/operations that occur within a specified time interval or in a dynamically calculated time interval.

FIGS. 4A and 4B are diagrams illustrating aspects of device wakeup in accordance with certain aspects of the disclosure. The diagrams 400, 401 illustrate wakeup optimizations for multiple applications (e.g., IoT applications). The diagram 400 includes Application 1 402, Application 2 404, and Application 3 406. The applications 402, 404, 406 operate independent from each other and may not be aware that the other applications are running and/or when the other applications are scheduled to run. Each application 402, 404, 406 may be configured to provide a respective proposed wakeup interval 408 to the PSM coordinator of the device, instead of providing a specific time value. The proposed wakeup interval 408 may be a range of time during which the application may need to perform an operation (e.g., a communication operation). In some aspects, the application transmits a communication to a server during the proposed wakeup interval 408. In some aspects, the application monitors for communications during the proposed wakeup interval 408 and/or transmits communications during the proposed wakeup interval 408. The transmissions may be in response to a communication received while monitoring during the proposed wakeup interval, or may be a scheduled transmission. Each application 402, 404, 406 may also be configured to provide a time duration for the application to perform the operation. In some aspects, the time duration may be provided within the proposed wakeup interval 408. In some aspects, the time duration may be provided separate from the proposed wakeup interval 408. The application need only perform a wakeup during a portion of the proposed wakeup interval 408 and does not need the device to be awake throughout the interval. The application performs the wakeup during the portion of the proposed wakeup interval 408 for the time duration needed to perform the operation. In order for the application to perform the operation, the device must wakeup (e.g., exit PSM). As such, the proposed wakeup interval 408 provides a range of time within which the device needs to wakeup to allow the application to perform the operation.

In some aspects, the wakeup time interval may include a start time and an end time. In some aspects, the wakeup time interval may include a start time and a time duration. At least one advantage to utilizing wakeup time intervals is that the device wakeup may occur at any time within the range of the application's proposed wakeup time interval 408, such that more than one application (e.g., applications 402, 404, 406) is likely to be able perform its operation during the wakeup time interval of a different application in comparison to instances where the specific wakeup times for the different applications overlap in time. This allows multiple applications to have their device wakeups synchronized, which can reduce the number of wakeups performed by the device.

With reference to FIG. 4, Application 1 402 has a wakeup interval 408 that starts first in time. The wakeup interval 408 of Application 1 402 provides the range of time in which the device must wakeup to allow Application 1 402 to perform its operation. Application 2 404 has a wakeup interval 408 that starts after the wakeup interval of Application 1. The wakeup intervals of each application can be the same or different. In the aspect of FIG. 4, the wakeup intervals of Application 1 402 and Application 2 404 start at different times, but may end at or around the same time. Application 3 406 has a wakeup interval 408 that starts after the wakeup intervals of Application 1 402 and Application 2 404, and has an end time that extends beyond the end of the wakeup intervals of Application 1 402 and Application 2 406. The overlap region 414 is the time when the wakeup intervals of the applications 402, 404, 406 overlap, such that all three applications 402, 404, 406 can perform their operations within the overlap region 414. As such, the device may wakeup during the overlap region 414 to allow the applications 402, 404, 406 to perform their operations. The overlap region 414 provides a time where the applications 402, 404, 406 can perform their operation within a single device wakeup. In some aspects, the time duration that each application needs to perform the respective operation, within the respective wakeup interval 408, may be accounted for when determining the actual scheduled wakeup 412. For example, the total time durations to perform the operation for each application should fall within the overlap region 414, such that all the operations may be performed within the overlap region 414. Accounting for the respective time durations may ensure that the actual scheduled wakeup 412 occurs within the overlap region 414 while providing sufficient time for all the operations to be performed prior to the end of the overlap region 414. The overlap region 414 reduces the number of device wakeups, which enhances battery lifetime and performance.

FIG. 4B illustrates a diagram 401 in which the applications 402, 404, 406 can further provide a preferred interval 410, within the wakeup interval 408, which identifies a range of time where the application prefers to perform its operation. In other words, the preferred interval 410 identifies a time in which the application prefers the occurrence of the device wakeup in order to perform its operation. The preferred interval 410 is a shorter range of time that is within the range of time of the wakeup interval 408. While the device may prefer the indicated preferred interval, the device wakeup may still occur within the interval 408 yet outside of the preferred interval 410. The PSM may determine that the device wakeup will occur within the preferred interval 410 in instances where multiple preferred intervals 410 of multiple applications overlap.

With reference again to FIG. 4B, Application 1 402 has a preferred interval 410 that is first in time. The preferred interval 410 for any of the applications may occur at any time within the respective wakeup interval 408 and is not required to occur at a specific time. Application 2 404 has a preferred interval 410 that starts after the ending of the preferred interval of Application 1. Application 3 has a preferred interval 410 that partially overlaps the preferred interval 410 of Application 2. The overlapping portions of the preferred intervals of Application 2 and Application 3 form a preferred region 416. The preferred region 416 is a time when multiple applications (e.g., Application 2 404 and Application 3 406) have overlapping preferred intervals 410, such that the three applications 402, 404, 406 can perform their operations within the preferred region 416. As such, the device may wakeup during the preferred region 416 to allow the applications 402, 404, 406 to perform their operations. The preferred region 416 provides a time where the applications 402, 404, 406 can perform their operation within a single device wakeup. The preferred region 416, as shown in FIG. 4, is less than the overlap region 414, and thus further optimizes the device wakeup procedure by reducing the overall time that the device is active. Although the preferred interval 410 of Application 1 is outside the preferred region 416, the preferred region is within the wakeup interval 408 of Application 1, which allows Application 1 to perform its operation during the preferred region 416. In this instance, not all of the preferred intervals 410 overlap, but since at least two preferred intervals overlap, the preferred region 416 is able to be defined by the overlapping portions of the preferred intervals. In some aspects, none of the preferred intervals 410 of the applications may overlap, and in such instances, the device wakeup may be based on the overlap region 414.

In one example, the PSM may schedule the wakeup to occur within a maximum number of overlapping preferred intervals. In another example, the PSM may schedule the wakeup to occur within at least one preferred interval based on a priority level of the preferred interval or of the corresponding application. In yet another example, the PSM may schedule the wakeup to occur regardless of the preferred intervals and/or the priority levels, such that the scheduling minimizes the total number of wakeups.

The information related to the wakeup interval 408 and the preferred interval 410 may be provided by the applications to the PSM coordinator. The PSM coordinator collects the wakeup interval 408 and preferred interval 410 from each application and is configured to sort the intervals. The earliest wakeup interval is the one with the earliest start time of the collected wakeup intervals. The PSM coordinator may be configured to group the wakeup time intervals for the applications and arrange them in order by time. The PSM coordinator can then identify a first device wakeup time interval that includes overlapping wakeup time intervals for the applications, as shown in FIG. 4. In some aspects, the PSM coordinator may be configured to identify whether the earliest wakeup interval 408 overlaps with any of the other wakeup intervals. In such instances, the PSM coordinator may identify such overlap as the overlap region 414, such that the PSM may schedule a device wakeup within the overlap region 414 in order for the overlapping applications to perform their respective operation. The PSM coordinator may be further configured to identify a preferred wakeup time interval (e.g., preferred interval 410) within each wakeup interval 408. In some aspects, the PSM coordinator may identify a sub-interval (e.g., preferred region 416) that includes an overlap of at least two preferred wakeup time intervals. In such instances, the PSM coordinator may then schedule the device wakeup during the sub-interval (e.g., preferred region 416). The sub-interval (e.g., preferred region 416) may comprise an overlap of a maximum number of preferred wakeup time intervals from each of the plurality of applications. At least one advantage is that the device wakeup may be scheduled during the sub-interval (e.g., preferred region 416) in order to synchronize multiple operations within the sub-interval. This allows the applications to perform their respective operation within the sub-interval (e.g., preferred region 416) and reducing the total wakeup time of the device.

In some aspects, the PSM coordinator may be configured to identify a preferred wakeup time interval (e.g., preferred interval 410) and an associated priority value within each wakeup time interval from each of the applications. Each preferred wakeup time interval may comprise a range of time that a respective application indicates as preferred to perform an operation. In some aspects, each preferred wakeup time interval may be less than or equal to a corresponding wakeup time interval. Each preferred wakeup time interval may have a priority based on the associated priority value. Each of the applications may be configured to provide a proposed priority associated with its preferred interval 410. Once the PSM coordinator has sorted the wakeup intervals and arranged them in sequential order and has identified the device wakeup interval (e.g., overlap region 414), the PSM coordinator may be configured to then identify all the preferred intervals 410 along with the associated priorities. The PSM coordinator may then schedule a device wakeup during the highest priority preferred wakeup time interval (e.g., preferred interval 410). For example, as shown in FIG. 4, the preferred region 416 is identified in relation with the overlap of the preferred intervals 410 of Application 2 404 and Application 3 406. Although not explicitly defined in FIG. 4, either of Application 2 or Application 3 may have the highest priority preferred wakeup time interval.

The PSM coordinator may be configured to efficiently schedule device wakeups based on information received from the applications. In some aspects, one or more of the applications may be configured to provide multiple wakeup intervals to the PSM coordinator. The multiple wakeup time intervals may correspond to a periodicity of an event associated with one or more of the applications. An event may comprise an operation that the application requires to be performed by the UE, e.g., operation(s) including any of performing a measurement, evaluating a measurement, performing a registration, performing a registration update, providing a report of information, etc. Thus, the event requires the UE to wake up in order to perform the operation. Thus, the PSM coordinator may have a full view of future scheduling opportunities and may be able to synchronize future device wakeups more effectively. In some aspects, the PSM coordinator may be configured to share the latest device wakeup schedule (including the associated periodicities, if present) with the applications, as asynchronous notification. The applications may then be configured to adjust and/or update their respective wakeup intervals based on the overall device wakeup schedule. In some aspects, the applications may also query the latest device schedule before proposing their own wakeup interval to the PSM coordinator. The application may then be able to further adjust and/or update their respective wakeup intervals based on the latest device schedule. In some aspects, the applications may also submit a request for the preferred wakeup periodicity, an anchor time, or a range of anchor times. An anchor time may be a specific time which the device wakes up to perform an operation. For example, an application may have an anchor time of two hours, such that the device wakes up every two hours to perform its operation. In some examples, an application may have a range of anchor times (e.g., every 2-3 hours), such that the device wakes up every 2-3 hours to perform its operation. In response to the request from the applications, the PSM coordinator may be configured to provide the preferred wakeup periodicity, preferred anchor time within the provided range and based on the PSM coordinator's knowledge of the current schedule.

Figure 5:
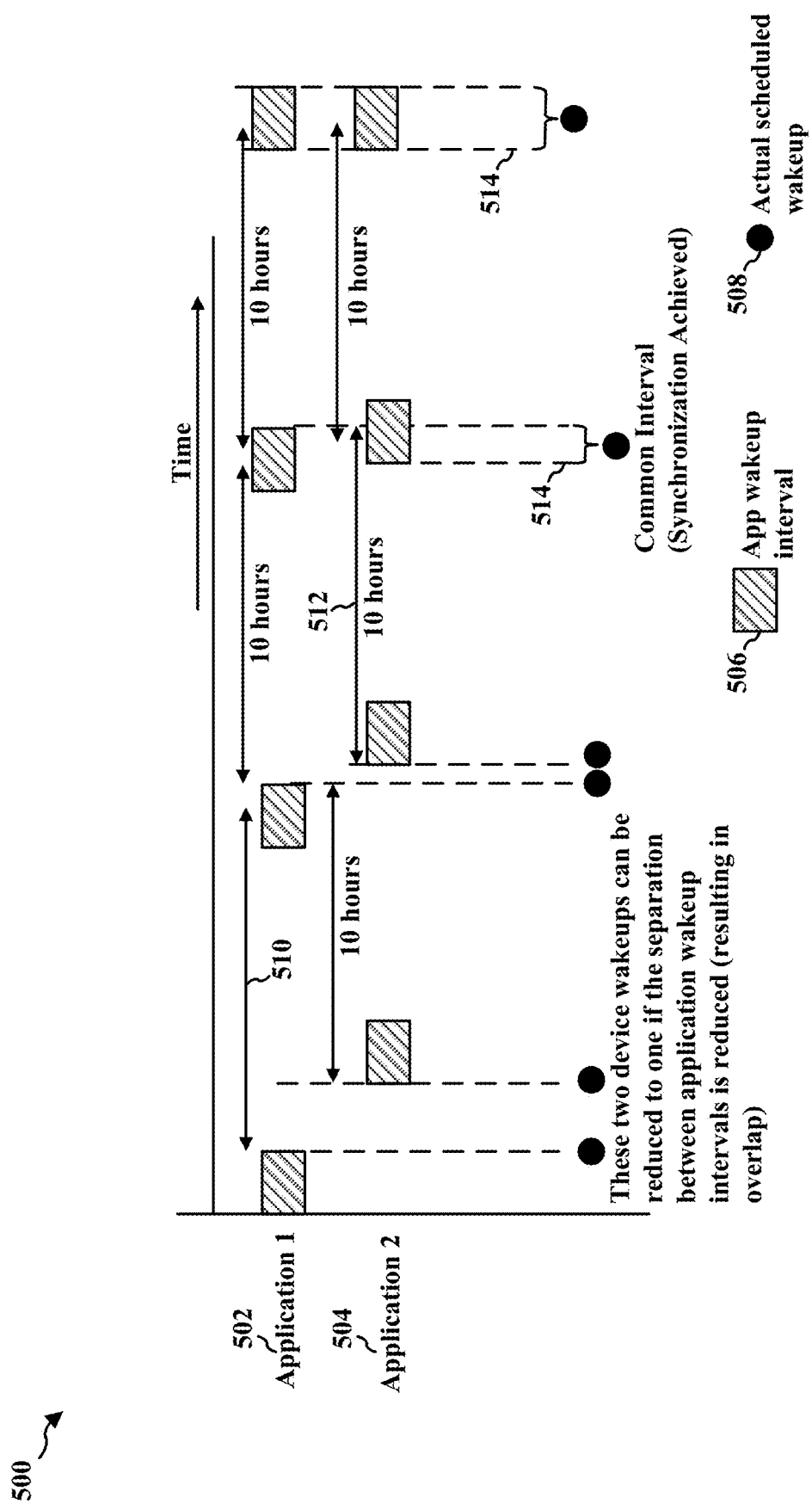
FIG. 5 is a diagram illustrating a synchronized device wakeup in accordance with certain aspects of the disclosure.

In some aspects, as shown in FIG. 5, if the first wakeup interval 506 does not overlap with any of the remaining wakeup intervals (e.g., wakeup interval 506 of Application 2 504), then the PSM coordinator may be configured to schedule a first device wakeup 508 for Application 1 502 towards the end of the first wakeup time interval 510. The PSM coordinator may also be configured to schedule a second device wakeup 508 for Application 2 504 at a time closer to the start of a second wakeup time interval 512. Over time, the first device wakeup and the second device wakeup may be scheduled to align with each other, such that the first device wakeup 508 and the second device wakeup 508 may overlap at a region 514 in a future wakeup time interval. In the aspect of FIG. 5, Application 1 502 may have a wakeup interval separation 510 of 10 hours, and Application 2 504 may also have a wakeup interval separation 510 of 10 hours. In such instance, the first wakeup intervals of the applications do not overlap, in response, the PSM coordinator may cause the device wakeup for Application 1 closer to the end of its wakeup interval, while also scheduling the device wakeup for Application 2 to be closer to the start time of its wakeup interval. After the first 10 hour separation period for both Application 1 and Application 2 has elapsed, the wakeup intervals 506 of both Application 1 and Application 2 still do not overlap, but are closer than the previous occurrence. However, after the second 10 hour separation period for both Application 1 and Application 2 has elapsed, the respective wakeup intervals 506 are now overlapping and form the region 514, such that both Application 1 and Application 2 may perform their operations during the same device wakeup time.

Figure 6:
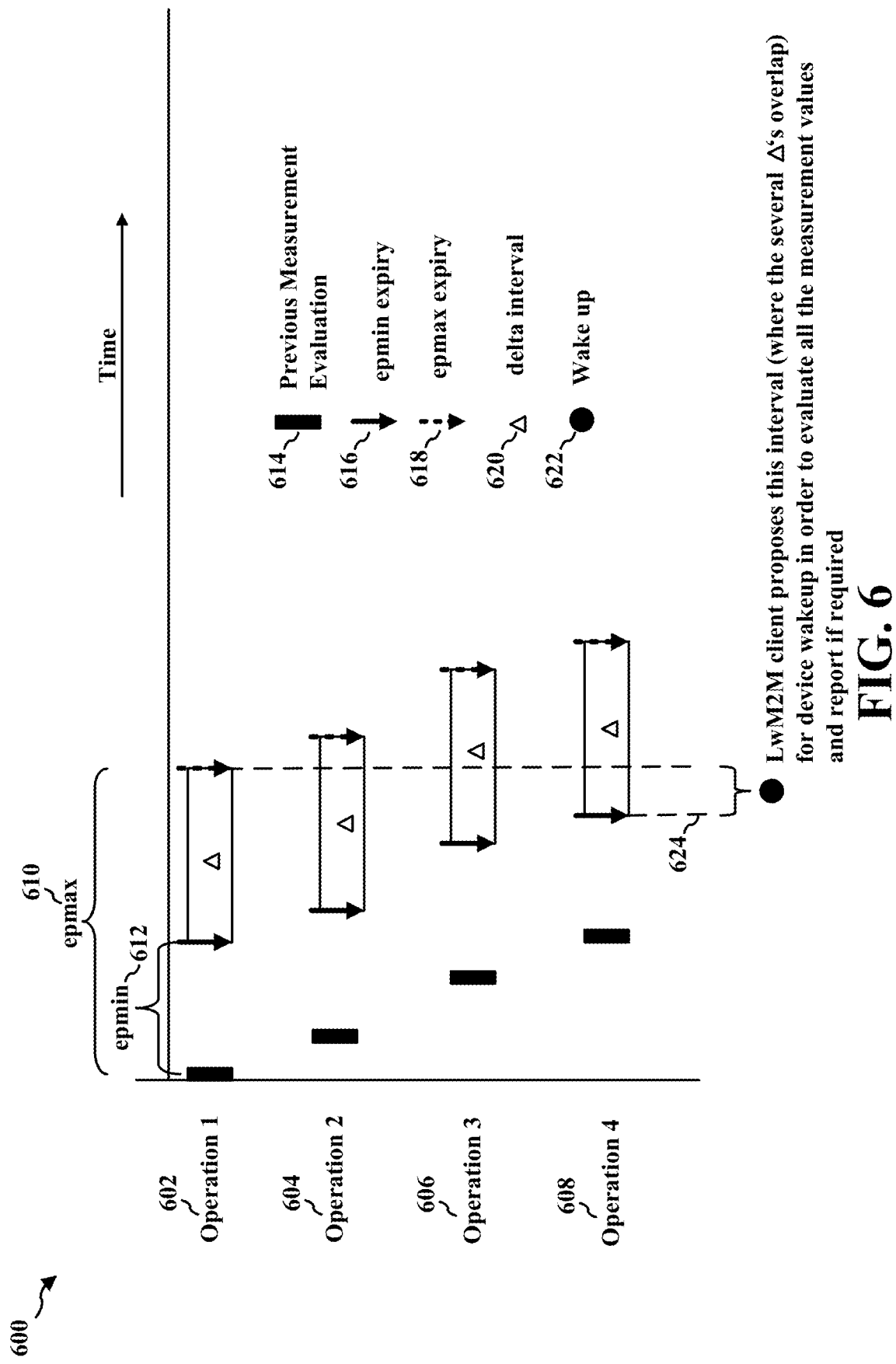
FIG. 6 is a diagram illustrating a device wakeup in accordance with certain aspects of the disclosure.

FIG. 6 is a diagram 600 illustrating a device wakeup in accordance with certain aspects of the disclosure. Rather than wakeup events triggered by applications at the device, an LwM2M client device may require device wakeup for events, operations and/or features, such as but not limited to registration update, information reporting, device management, and/or service enablement. The diagram 600 illustrates ways in which the aspects presented herein can optimize (e.g., synchronize) wakeup for LwM2M devices. While certain LwM2M devices may have no parameters or configuration that guide when the device should wake up (e.g., exits PSM) during the measurement evaluation period between a minimum period (pmin) and a maximum period (pmax) in order to evaluate measurement values, other LwM2M devices may use two attributes, e.g, minimum evaluation period (epmin) which indicates the minimum time the LwM2M client must wait between two evaluations of reporting criteria, and maximum evaluation period (epmax) which indicates the maximum time the LwM2M client may wait between two evaluations of reporting criteria. A device may enter PSM during epmin, and after epmax has expired, the device must exit PSM and perform a measurement evaluation.

Figure 7:
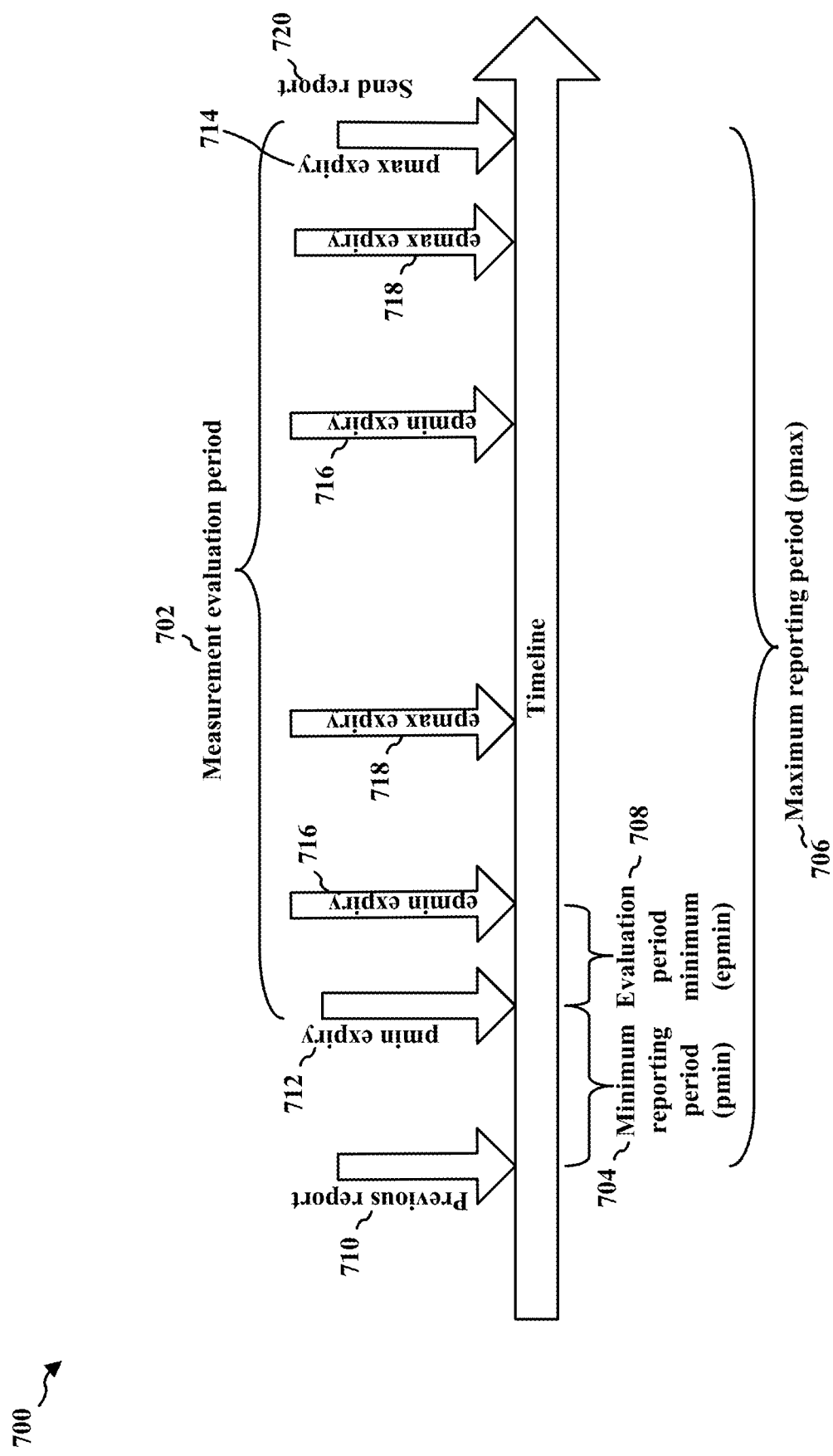
FIG. 7 is a diagram illustrating an evaluation period in accordance with certain aspects of the disclosure.

FIG. 7 is a diagram 700 illustrating an evaluation period in accordance with certain aspects of the disclosure. An Information Reporting Interface (e.g., that performs observe and notify operations), and with reference to FIG. 7, may limit measurement evaluations from occurring prior to pmin expiry 712, where pmin 704 is the minimum time interval between two reports to the server, and the previous report 710 being the most recent report sent to the server. At pmin expiry 712, measurement evaluations may be performed. After pmin expiry, measurement evaluations may be performed periodically during the measurement evaluation period 702 and a report may be sent out if the measurement values satisfy certain criteria. At pmax expiry 714, a device wakeup occurs and a report 720 is immediately sent out. Pmax 706 is the maximum time interval between two reports to the server. Between pmin 704 and pmax 706 is the epmin expiry 716 and the epmax expiry 718, and these define how often measurement evaluations should be done between the pmin expiry 712 and the pmax expiry 714. The measurement evaluations may be performed at a precise time (e.g., at epmin expiry 716 and epmax expiry 718) and may require a device wakeup at each measurement evaluation, which could cause multiple device wakeup and reduce battery lifetime. However, in order to optimize the device wakeups, a delta interval ($\Delta$) may be introduced such that operations (e.g., measurement evaluations) may be performed over a range of time instead of a precise time (e.g., pmin expiry 712). The range of time may be the precise time plus the delta interval. For example, instead of having a measurement occur at the precise time of the pmin expiry 712, the measurement may occur within the pmin expiry 712 and the pmin expiry 712 plus the delta interval. In some aspects, the delta interval may be configured to be a fixed value, or may be dynamically determined to synchronize multiple applications/activities/operations in a single wakeup. As discussed above, the device may stay in PSM until pmin expiry, and after pmin expiry (e.g., at time T1), the device may be configured to wake up in the interval of (T1, T1+$\Delta$)). For pmax, the LwM2M client must send a report by pmax expiry (e.g., at time T2), if not already done, within the interval of (T2-$\Delta$, T2). As used herein, the terms applications, activities, and operations may be interchangeable.

In some aspects, the delta interval may be a function of epmax, epmin, pmin, pmax, or a configuration of the device. In some aspects where epmin and epmax are defined, the delta interval may equal the different between epmax and epmin (e.g., epmax—epmin). In some aspects where epmax and epmin are not defined, the delta interval may be based on many different attributes, for example, as a fraction of pmin, a fraction of pmax, pmin, a pre-configured default value, or a configured value for the type of measurement. The delta interval may apply to all device wakeups including pmin, pmax, and measurement evaluations. In some aspects, the delta interval may be a function of the lifetime of the registration. For example, some implementations for the lifetime extension require a registration update to be sent out during the last 10% of lifetime of the registration, e.g., between 90% and 100% of the lifetime of the registration. In some aspects, the delta interval may be of less significance for some events that are unlikely to coincide with other events, such as but not limited to bootstrap and registration. Thus, the delta interval might not be used in connection with certain events, such as bootstrap and registration.

Referring back to FIG. 6, the diagram 600 displays multiple measurement evaluations (602, 604, 606, 608) that may need to be performed, e.g., by an LwM2M device. The epmax 610 and epmin 612 are defined based on the previous measurement evaluation 614 of Operation 1 602. The epmin expiry 616 of Operation 1 602 is shown at the end of the range of epmin 612. The epmax expiry 618 of Operation 1 602 is shown at the end to the range of epmax 610. The delta interval 620 of Operation 1 602 may be configured to provide an interval such that Operation 1 may perform a measurement evaluation within the delta interval 620, such that the measurement evaluation of Operation 1 may occur at the same time as the measurement evaluation of Operations 2-4 604, 606, 608, in order to synchronize the device wakeup for Operations 1-4. Each Operation 602, 604, 606, 608 may correspond to a LwM2M application. Each Operation 602, 604, 606, 608 has a respective delta interval 620, and the LwM2M client may be configured to identify where the delta intervals 620 may overlap to form an overlapping region 624. The LwM2M client may be configured to sort the operations based on the previous measurement evaluation 614 and determine the wakeup time interval for each of the plurality of operations. In some aspects, each wakeup time interval comprises a start time and a delta interval based on one or more of an application type, a configured time interval, or an operation interval configured by a server. The LwM2M client may then form the overlapping region 624 where the respective delta intervals 620 of the operations overlap, and may schedule a device wakeup 622 within the overlapping region 624. This optimizes the device wakeup 622 so that only one device wakeup is needed to allow the operations 602, 604, 606, 608 to be performed.

Figure 8:
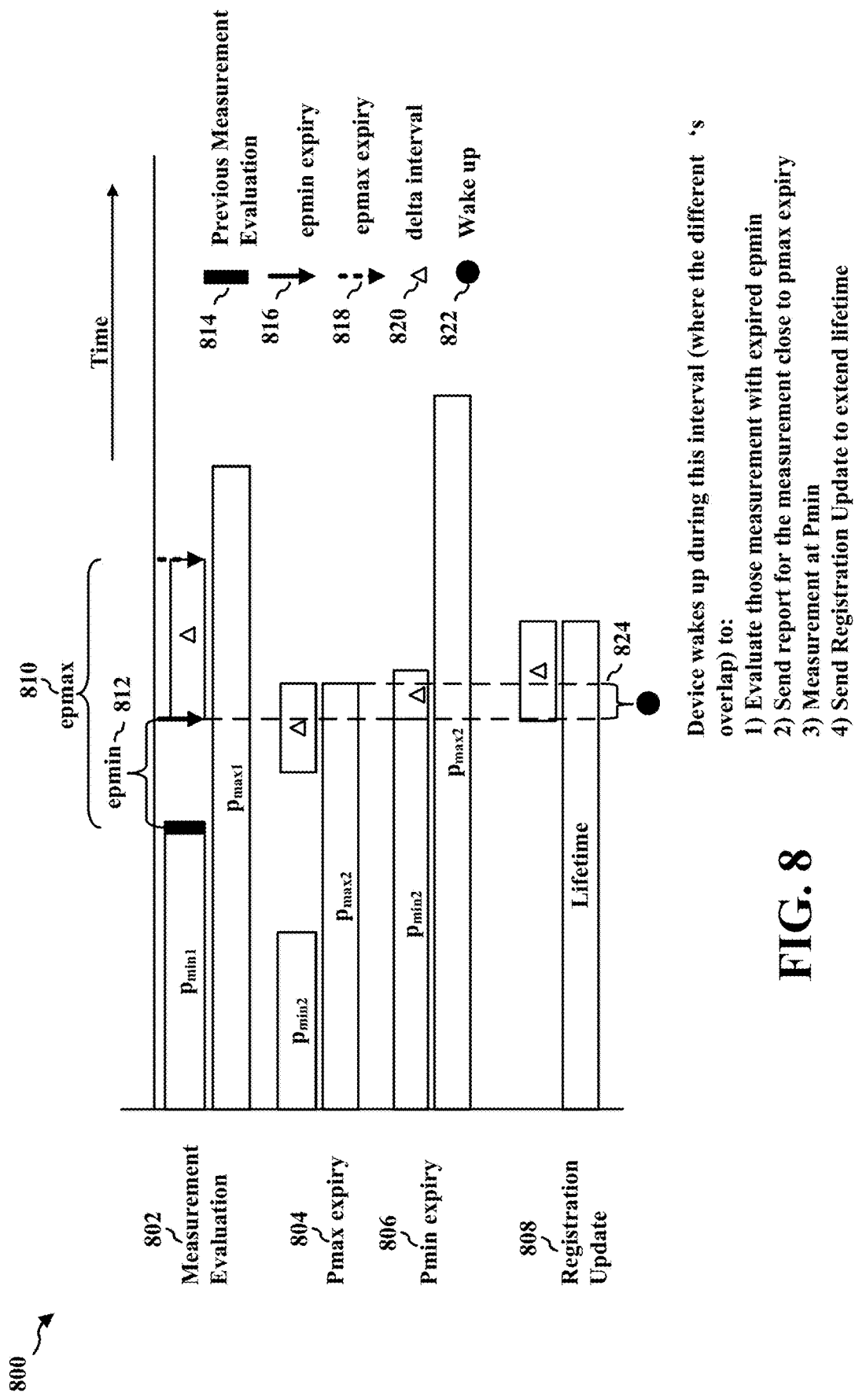
FIG. 8 is a diagram illustrating a synchronized device wakeup in accordance with certain aspects of the disclosure.

FIG. 8 is a diagram illustrating a synchronized device wakeup for different operations in accordance with certain aspects of the disclosure. The diagram 800 is directed to the optimization of device wakeups for different LwM2M operations. For example, diagram 800 includes measurement evaluation operation 802, a second operation/event/function that requires wakeup 804, a third operation/event/function that requires wakeup 806, and registration update 808. Each of these operations require a device wakeup to allow the operation to perform a function. To synchronize the different LwM2M operations/events/functions (e.g., Bootstrap, Registration, and Information Reporting), wakeup interval times (e.g., start time and delta interval ($\Delta$)) may be determined for each operation/event/function. In some aspects, the delta interval ($\Delta$) for each operation/event/function may be configured (e.g., fixed value) or may be dynamically determined. In some aspects, the wakeup interval start time and wakeup type may be determined based on the type of operation/event/function. For example, a wakeup interval time (e.g., start time and delta interval ($\Delta$)) associated with an LwM2M registration update operation for a lifetime extension may be determined by using a configured percentage of the registration lifetime (e.g., a registration update is sent out during the last 5% of the registration lifetime). A wakeup interval time associated with an LwM2M bootstrap retry attempts may be determined using the configured retry time values. For example, if the bootstrap attempt fails, the device may attempt additional retries with increasing delay between each subsequent attempts (e.g., 2 min, 4 min, 8 min, 16 min).

The epmax 810 and epmin 812 are defined based on the previous measurement evaluation 814. Device wakeups occur for the measurement evaluation 802 occurs after the pmin expiry and before the pmax expiry. Another event that requires a device wakeup occurs at the pmax expiry 804 where a report must be sent to the server by the pmax expiry. In some aspects, a wakeup time interval associated with maximum evaluation period may be based on at least one of the difference between epmax and epmin, if both epmin and epmax are defined, or the configured percentage of pmax. Another event that also requires a device wakeup occurs at pmin expiry 806 after pmin to do a measurement evaluation. In some aspects, a wakeup time interval associated with a minimum period may be based at least on one of a maximum evaluation period, a minimum evaluation period, or a pre-defined evaluation period. In some aspects, a wakeup interval time associated with a measurement evaluation may be based on at least one of the difference between the epmax and epmin, if both epmin and epmax are defined; the configured percentage of pmin, if pmin is defined; the configured percentage of pmax, if pmax is defined; or a configured default value. Another event that requires a device wakeup is the registration update 808 where a registration update is sent to the server to extend its lifetime. As shown in FIG. 8, instead of having the operations performed at a specific time, the introduction of the delta intervals 820 allows the operations to be performed within a range of time, such that any overlapping delta intervals 820 may be identified, grouped together, and used to schedule a single device wakeup 822. The overlapping region 824 can be identified at an interval of time in which the device may wakeup and allow a measurement evaluation 802 to be performed, the pmax expiry 804 to send the report to the server, the pmin expiry 806 to perform a measurement evaluation, and the registration update 808 to send the registration update to the server to extend its lifetime. Any combination of these events (802, 804, 806, 808) can be scheduled to be performed during one device wakeup interval instead of requiring four different device wakeups. This optimizes the LwM2M operations into a reduced amount of device wakeups which further prolongs the battery lifetime as well as reduces the duration of time that the device is activated.

Figure 9:
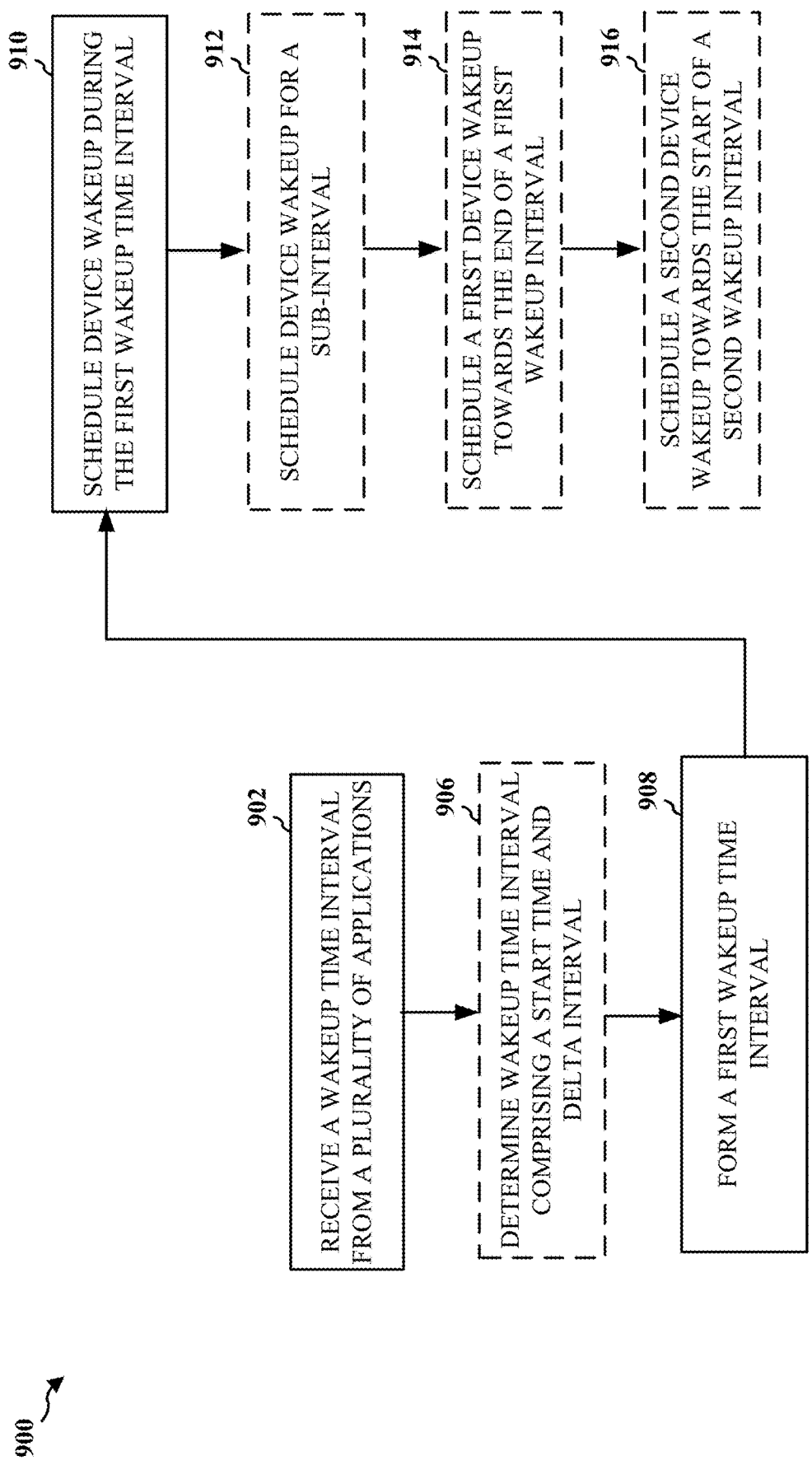
FIG. 9 is a flowchart of a method of wireless communication.

FIG. 9 is a flowchart 900 of a method of wireless communication. The method may be performed by a UE (e.g., the UE 104, 350, the apparatus 1002/1002'). Optional aspects are illustrated with dashed lines. Aspects of the method may help a UE to optimize device wakeup times to allow multiple operations to be performed efficiently.

At 902, the UE may receive a wakeup time interval from a plurality of applications, as described in connection with FIGS. 4A, 4B, 6, and 8. The wakeup time interval may comprise a range during which the device may need to wakeup to allow a respective application to perform an operation. For example, the LwM2M client may need to coordinate device wakeups for different events/operations/ features, such as measurement evaluations 802 that occur after the pmin expiry and before the pmax expiry, registration update 808 where a registration update is sent to the server, and/or at the pmax expiry 804 where a report must be sent to the server by the pmax expiry. In some aspects, the wakeup time interval may comprise a start time and an end time. In some aspects, the wakeup time interval may comprise a start time and a duration of time. In yet some aspects, multiple wakeup time intervals may be received from at least one of the plurality of applications with a periodicity of an event associated with each of the multiple wakeup time intervals. An event may comprise an operation that the application requires to be performed by the UE, e.g., operation(s) including any of performing a measurement, evaluating a measurement, performing a registration, performing a registration update, providing a report of information, etc. Thus, the event requires the UE to wake up in order to perform the operation.

Each wakeup time interval received at 902 may correspond to a preferred wakeup time interval (e.g., 414, 514, 624, 824) for the corresponding application from the plurality of applications. In some aspects, the UE may identify a sub-interval (e.g., 416) comprising an overlap of a maximum number of preferred wakeup time intervals from each of the plurality of applications, e.g., an overlap of at least two preferred wakeup time intervals. In some aspects, the preferred wakeup time interval of each respective wakeup time interval may comprise a range of time that a respective application prefers to perform an operation. Each preferred wakeup time interval may be less than a corresponding wakeup time interval. In some aspects, the sub-interval may maximize a number of preferred intervals comprised in the overlap.

At 906, the UE may determine the wake up time interval for each of the plurality of operations. In some aspects, each wakeup time interval comprises a start time and a delta interval based on one or more of an application type, a configured time interval, or an operation interval configured by a server, as described in connection with delta interval 620 in FIG. 6 and delta interval 820 in FIG. 8. In some aspects, the delta interval may be a fixed value or dynamically determined to synchronize multiple operations within the delta interval. In some aspects, the delta interval may be the difference between a maximum evaluation period (epmax) and a minimum evaluation period (epmin), when both epmax and epmin are known.

At 908, the UE may form a first wakeup time interval (e.g. 416). In some aspects, the first wakeup time interval may comprise overlapping wakeup time intervals for the plurality of applications.

At 910, the UE may schedule a device wakeup (e.g., 412 in connection with 414) during the first wakeup interval. At 912, the UE may schedule a device wakeup during the sub-interval (e.g., 412 in connection with 416). In some aspects, a preferred wakeup time interval may have an associated priority value. The device wakeup may be scheduled during a highest priority preferred wakeup time interval having a highest priority value associated with the preferred wakeup time interval. In some aspects, if a first wakeup time interval does not overlap with a second wakeup interval, the UE, at 914, may schedule the first device wakeup towards the end of the first wakeup time interval, as also shown in FIG. 5, and at 916, the UE may schedule a second device wakeup at a start of a second wakeup time interval, as also shown in FIG. 5. The first device wakeup and the second device wakeup may be scheduled to align future device wakeups in a future wakeup time interval. In some aspects, a device wakeup schedule may be provided to each of the plurality of applications, wherein at least one of the plurality of applications is configured to adjust its wakeup time interval based on the device wakeup schedule. In some aspects, a request may be received from the at least one of the plurality of applications, wherein the device wakeup schedule is provided in response to a request from the at least one of the plurality of applications. In some aspects, a request may be received for wakeup information from at least one of the plurality of applications, wherein the wake up information comprises at least one of a preferred wakeup periodicity, an anchor time, or a range of anchor times. The wakeup information may be provided to the at least one of the plurality of applications in response to the request.

Figure 10:
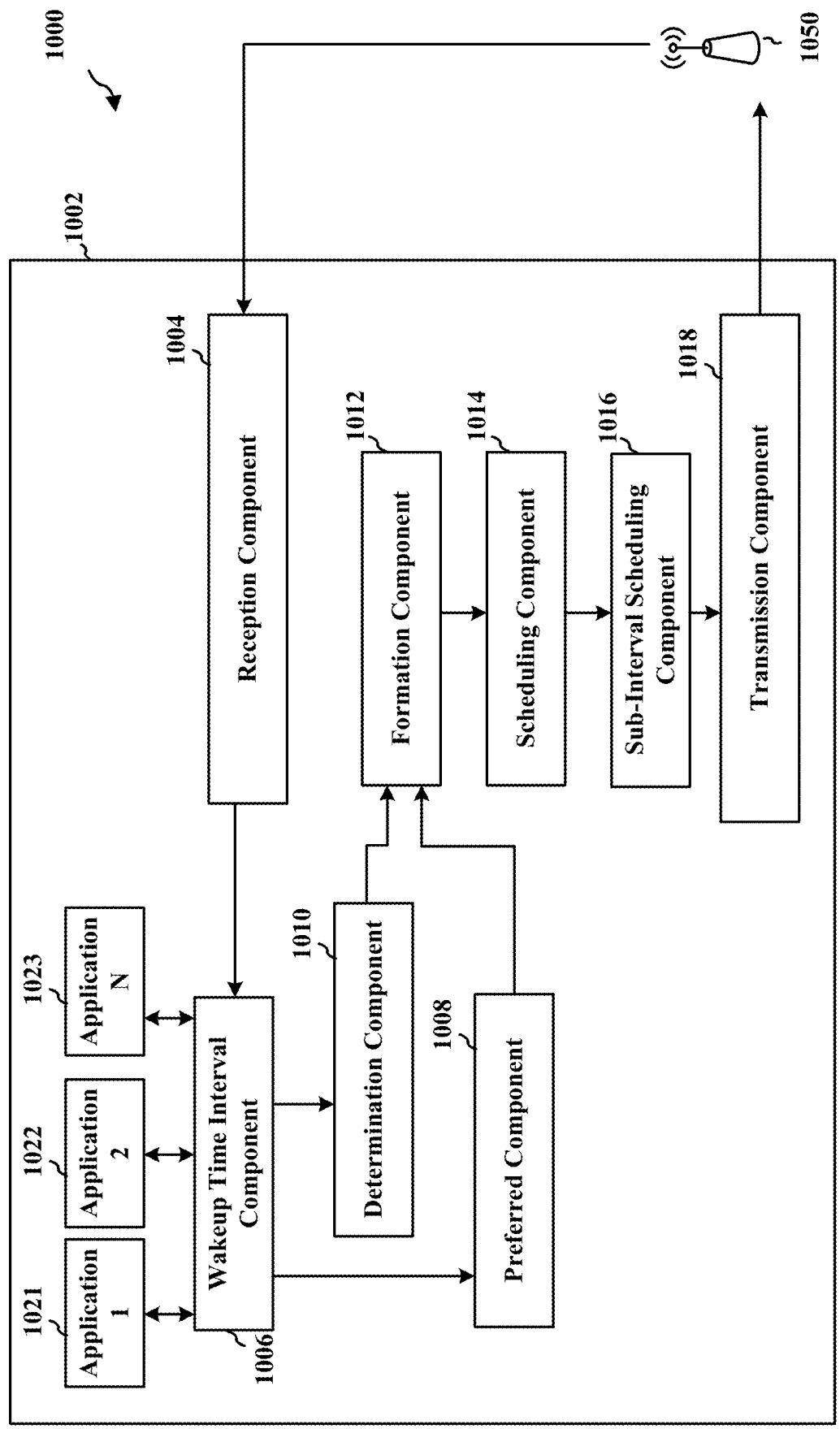
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., 104, 350, apparatus 1102/1102') in wireless communication with a base station 1050 (e.g., base station 102, 180, 310). The apparatus includes a reception component 1004 that receives downlink communication from the base station 1050. The apparatus may include a wakeup time interval component 1006 that receives a wakeup time interval from each of a plurality of applications 1021, 1022, 1023 and/or receives an indication of a client-related event/operation feature that requires a wake up. The apparatus may also include a preferred component 1008 wherein each wakeup time interval corresponds to a preferred wakeup time interval within each wakeup time interval (e.g., 414, 514, 624, 824), a determination component 1010 configured to determine the wake up time interval, comprising a start time and a delta interval, for each of the plurality of operations based on one or more of an application type, a configured time interval, or an operation interval configured by a server, a formation component 1012 that forms a first wakeup time interval, a scheduling component 1014 that schedules a device wakeup during the first wakeup interval, a sub-interval scheduling component 1016 that schedules a device wakeup during the sub-interval, and a transmission component 1018 that transmits uplink communication to the base station 1050. In some aspects, the first device wakeup time interval formed by the formation component 1014 may comprise overlapping wakeup intervals for the plurality of applications or for the plurality of operations. In one example, if the second wakeup time interval does not overlap with a third wakeup time (or with any of the remaining wakeup intervals), the scheduling component 1014 may schedule a second device wakeup toward an end of the second wakeup time interval and schedule a third device toward a start of the third wakeup time interval.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
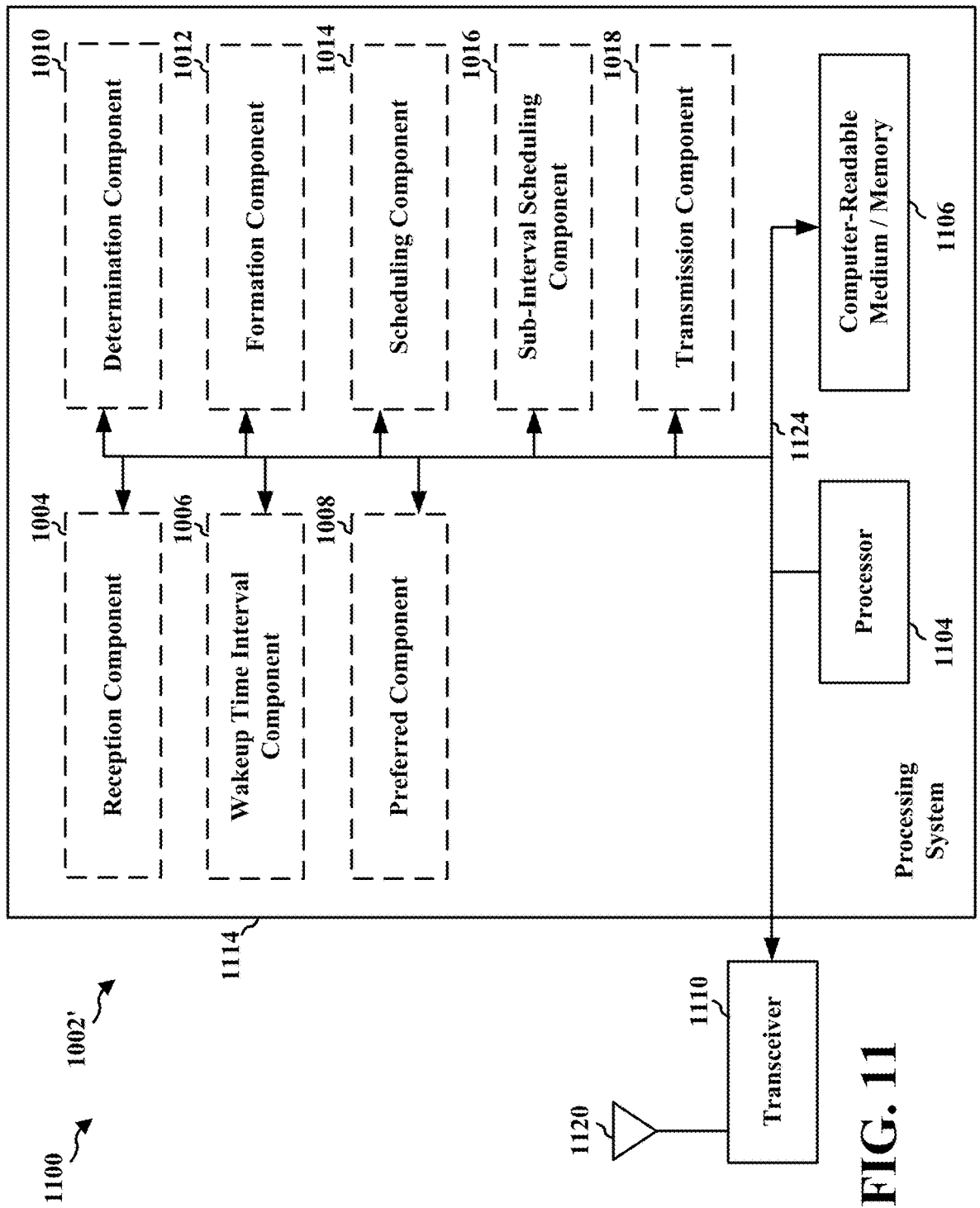
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, and 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1018, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, and 1018. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving a wakeup time interval from each of a plurality of applications (e.g., at least wakeup time interval component 1006), means for forming a first wakeup time interval, the first device wakeup time interval comprising overlapping wakeup time intervals for the plurality of applications (e.g., at least grouping component 1014), means for scheduling a device wakeup during at least the first wakeup time interval (e.g., at least scheduling component 1016), means for identifying a preferred wakeup time interval within each wakeup time interval from each of the plurality of applications (e.g., at least identification component 1008), means for identifying a sub-interval comprising an overlap of a maximum number of preferred wakeup time intervals from each of the plurality of applications, means for scheduling the device wakeup for a sub-interval (e.g., at least sub-interval scheduling component 1016), the sub-interval comprises an overlap of a maximum number of preferred wakeup time intervals from each of the plurality of applications, wherein if a first wakeup time interval does not overlap with a second wakeup interval, the method further comprises means for scheduling a first device wakeup towards an end of the first wakeup time interval (e.g., at least scheduling component 1014), means for scheduling a second device wakeup at a start of a second wakeup time interval (e.g., at least scheduling component 1014), means for providing a device wakeup schedule to each of the plurality of applications, wherein at least one of the plurality of applications is configured to adjust its wakeup time interval based on the device wakeup schedule (e.g., at least wakeup time interval component 1006), means for determining the wake up time interval, comprising a start time and a delta interval, for each of the plurality of operations based on one or more of an application type, a configured time interval, or an operation interval configured by a server (e.g., at least determination component 1010). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Optimizing the manner in which the devices wakeup can lead to a reduction in the number of wakeup per day, which can extend the life of the battery. In some instances, these devices may experience 4 device wakeups in a day, and reducing the device wakeups to 3 in a day could lead to an extended lifetime of the battery and device. The grouping or synchronizing of multiple events in the same device wakeup may reduce the number of required device wakeups and average duration of each wakeup. In some aspects, the synchronization may occur across multiple applications. These applications typically run independently and may not be aware of the operation of other applications. Each application is configured to provide a wakeup time interval, and the PSM coordinator may be configured to schedule a single wakeup interval for multiple applications having overlapping wakeup intervals. At least one advantage of synchronizing the multiple events into a single device wakeup is that battery lifetime may be improved, due to the reduction of device wakeup and the power savings associated in reducing the number of device wakeups.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving a wakeup time interval from each of a plurality of applications or for each of a plurality of operations, wherein each wakeup time interval comprises a preferred wakeup time interval and each preferred wakeup time interval is less than a corresponding wakeup time interval;
    forming a first wakeup time interval, the first wakeup time interval comprising overlapping wakeup time intervals for the plurality of applications or for the plurality of operations;
    scheduling a device wakeup during a sub-interval of at least the first wakeup time interval, the sub-interval comprising an overlap of at least two of the preferred wakeup time intervals; and
    performing the device wakeup during the sub-interval.

2. The method of claim 1, wherein the wakeup time interval from each of the plurality of applications comprises a range of time for a respective application to perform a communication operation.

3. The method of claim 2, wherein the wakeup time interval from each of the plurality of applications comprises a start time and one of an end time or a time duration.

4. The method of claim 1, wherein an application, of the plurality of applications, indicates multiple wakeup time intervals, the multiple wakeup time intervals corresponding to a periodicity of an event associated with the application.

5. The method of claim 1,
    wherein the at least two of the preferred wakeup time intervals comprises a maximum number of preferred wakeup time intervals from each of the plurality of applications.

6. The method of claim 1, wherein each preferred wakeup time interval comprises a range of time that a respective application indicates as preferred to perform an operation.

7. The method of claim 1, wherein each preferred wakeup time interval has a priority based on an associated priority value, and wherein the device wakeup is scheduled during a highest priority preferred wakeup time interval.

8. The method of claim 1, wherein the first wakeup time interval does not overlap with a second wakeup time interval, and the first wakeup time interval and the second wakeup time interval are separated by a configured duration, the method further comprising:
    scheduling the device wakeup towards an end of the first wakeup time interval; and
    scheduling a second device wakeup at a start of the second wakeup time interval.

9. The method of claim 8, wherein the device wakeup and the second device wakeup are scheduled to align the device wakeup and the second device wakeup in a future wakeup time interval.

10. The method of claim 1, further comprising:
    providing a device wakeup schedule to each of the plurality of applications, wherein at least one of the plurality of applications is configured to adjust its wakeup time interval based on the device wakeup schedule.

11. The method of claim 1, further comprising:
    receiving a request for wakeup information from at least one of the plurality of applications, wherein the wakeup information comprises at least one of a preferred wakeup periodicity, an anchor time, or a range of anchor times; and
    providing the wakeup information to the at least one of the plurality of applications in response to the request.

12. The method of claim 1, further comprising:
    determining the wakeup time interval for each of the plurality of operations, each wakeup time interval comprising a start time and a delta interval based on one or more of an application type, a configured time interval, or an operation interval configured by a server.

13. The method of claim 12, wherein each of the plurality of operations correspond to a lightweight machine to machine (LwM2M) application.

14. The method of claim 13, wherein the wakeup time interval is associated with a minimum period, wherein the minimum period is based at least on one of a maximum evaluation period, a minimum evaluation period, or a predefined evaluation period.

15. An apparatus for wireless communication, comprising:
    at least one processor coupled to a memory, the at least one processor configured to:
        receive a wakeup time interval from each of a plurality of applications or for each of a plurality of operations, wherein each wakeup time interval comprises a preferred wakeup time interval and each preferred wakeup time interval is less than a corresponding wakeup time interval;
        form a first wakeup time interval, the first wakeup time interval comprising overlapping wakeup time intervals for the plurality of applications or for the plurality of operations;
        schedule a device wakeup during a sub-interval of at least the first wakeup time interval, the sub-interval comprising an overlap of at least two of the preferred wakeup time intervals; and
        perform the device wakeup during the sub-interval.

16. The apparatus of claim 15, wherein the at least two of the preferred wakeup time intervals comprises a maximum number of preferred wakeup time intervals from each of the plurality of applications.

17. The apparatus of claim 15, wherein the first wakeup time interval does not overlap with a second wakeup time interval, and the at least one processor is further configured to:

schedule the device wakeup towards an end of the first wakeup time interval; and schedule a second device wakeup at a start of the second wakeup time interval.

18. The apparatus of claim 15, wherein the at least one processor is further configured to:

determine the wakeup time interval for each of the plurality of operations, each wakeup time interval comprising a start time and a delta interval based on one or more of an application type, a configured time interval, or an operation interval configured by a server.

19. A non-transitory computer-readable medium storing computer executable code, the code when executed by a processor cause the processor to:

receive a wakeup time interval from each of a plurality of applications or for each of a plurality of operations, wherein each wakeup time interval comprises a preferred wakeup time interval and each preferred wakeup time interval is less than a corresponding wakeup time interval;

form a first wakeup time interval, the first wakeup time interval comprising overlapping wakeup time intervals for the plurality of applications or for the plurality of operations;

schedule a device wakeup during a sub-interval of at least the first wakeup time interval, the sub-interval comprising an overlap of at least two of the preferred wakeup time intervals; and perform the device wakeup during the sub-interval.

20. The non-transitory computer-readable medium of claim 19, wherein the at least two of the preferred wakeup time intervals comprises a maximum number of preferred wakeup time intervals from each of the plurality of applications.

21. The non-transitory computer-readable medium of claim 19, wherein each preferred wakeup time interval comprises a range of time that a respective application indicates as preferred to perform an operation.

22. The non-transitory computer-readable medium of claim 19, wherein the first wakeup time interval does not overlap with a second wakeup time interval, and the code when executed by the processor further cause the processor to:

schedule the device wakeup towards an end of the first wakeup time interval; and schedule a second device wakeup at a start of the second wakeup time interval.

23. The non-transitory computer-readable medium of claim 19, wherein the code when executed by the processor further cause the processor to:

determine the wakeup time interval for each of the plurality of operations, each wakeup time interval comprising a start time and a delta interval based on one or more of an application type, a configured time interval, or an operation interval configured by a server.

\* \* \* \* \*